US011886889B2

(12) United States Patent
Bhosle et al.

(10) Patent No.: US 11,886,889 B2
(45) Date of Patent: Jan. 30, 2024

(54) MANAGING CONFIGURATIONS OF SYSTEM SERVICES RUNNING IN A CLUSTER OF HOSTS BY MANAGING LIFECYCLE OF VIRTUALIZATION SOFTWARE

(71) Applicant: VMware, Inc., Palo Alto, CA (US)

(72) Inventors: Mayur Bhosle, San Jose, CA (US); Jeffrey Gabriel Hu, Palo Alto, CA (US); Mukund Gunti, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 437 days.

(21) Appl. No.: 17/156,497

(22) Filed: Jan. 22, 2021

(65) Prior Publication Data
US 2022/0237000 A1    Jul. 28, 2022

(51) Int. Cl.
*G06F 9/445* (2018.01)
*G06F 9/54* (2006.01)
*G06F 8/61* (2018.01)
*G06F 16/22* (2019.01)
*G06F 9/455* (2018.01)

(52) U.S. Cl.
CPC ............ *G06F 9/44505* (2013.01); *G06F 8/63* (2013.01); *G06F 9/45558* (2013.01); *G06F 9/547* (2013.01); *G06F 16/2282* (2019.01); *G06F 2009/45595* (2013.01)

(58) Field of Classification Search
CPC .... G06F 9/44505; G06F 16/2282; G06F 8/63; G06F 9/45558; G06F 9/547; G06F 2009/45595
See application file for complete search history.

(56) References Cited

U.S. PATENT DOCUMENTS 11,698,795 B2 * 7/2023 Bhosle ................ G06F 9/44505
                                                                    718/1
2019/0317750 A1 * 10/2019 Ramsay .................. G06F 9/547

* cited by examiner

*Primary Examiner* — Tammara R Peyton
(74) *Attorney, Agent, or Firm* — Kim & Stewart LLP

(57) ABSTRACT

A method of managing configurations of a plurality of system services, including a first system service and a second system service, in each of a plurality of hosts, wherein each of the hosts is configured with a virtualization software for supporting execution of virtual machines therein includes steps of: upon receiving an application programming interface (API) call to apply configurations of the system services defined in a desired configuration file to the system services, parsing the desired configuration file to identify a first configuration for the first system service and a second configuration for the second system service, and storing the first and second configurations in accordance with a configuration schema defined for the first and second system services, wherein the first system service executes with the stored first configuration applied thereto and the second system service executes with the stored second configuration applied thereto.

15 Claims, 10 Drawing Sheets

MANAGING CONFIGURATIONS OF SYSTEM SERVICES RUNNING IN A CLUSTER OF HOSTS BY MANAGING LIFECYCLE OF VIRTUALIZATION SOFTWARE

A typical software stack for configuration management of a system includes an application programming interface (API) layer, which provides an endpoint to configure and monitor the system, a business logic layer, which contains the API implementation, and a persistence layer, which persists any configuration or state changes in the system onto a disk. In the typical system, configuration actions performed by an end user are not persisted while the system is live. It is thus impossible to determine the configuration tasks previously performed by the user, especially after a long period of time has passed since boot-up of the system. Rather, only the resulting state of those tasks is persisted. The system can thus only report the current configuration state, and it is impossible to revert to a certain configuration state. In fact, it is difficult to even revert to the initial default configuration state.

The inability to determine the configuration tasks previously performed is especially problematic if the user must manage the system at a large scale. As the number of configurations that must be set and monitored increases, the complexity of managing the system grows. Only ad hoc solutions are available, and such solutions only provide configuration and compliance support for a limited set of configurations.

As disclosed in U.S. patent application Ser. No. 16/837,676, filed Apr. 1, 2020, the entire contents of which are incorporated by reference herein, a system may be implemented that defines which properties need to be persisted upfront in a configuration schema. The configuration schema may define such properties as either configurations or states. A configuration is data that the user provides as part of a configuration action. A state is data that the system generates internally, the state being further classified as either vital or cached. The system persists configurations and vital states across reboots but does not persist cached states.

By defining properties using configuration schemas, configuration actions can be tracked by storing updates to configurations in a database. As a result, configuration changes can be easily detected while the system is live. However, the system may include many services, including network time protocol (NTP) service, secure shell (SSH) service, authentication service, firewall service, network service, storage service, keyboard service, etc. It is still burdensome for the user to manage the configurations for all these different services separately.

SUMMARY

Accordingly, one or more embodiments provide a method of managing configurations of a plurality of system services, including a first system service and a second system service, in each of a plurality of hosts, wherein each of the hosts is configured with a virtualization software for supporting execution of virtual machines therein. The method includes the steps of: upon receiving an application programming interface (API) call to apply configurations of the system services defined in a desired configuration file to the system services, parsing the desired configuration file to identify a first configuration for the first system service and a second configuration for the second system service, and storing the first and second configurations in accordance with a configuration schema defined for the first and second system services, wherein the first system service executes with the stored first configuration applied thereto and the second system service executes with the stored second configuration applied thereto.

Further embodiments include a non-transitory computer-readable storage medium comprising instructions that cause a computer system to carry out the above method, as well as a computer system configured to carry out the above method.

DETAILED DESCRIPTION

Figure 1:
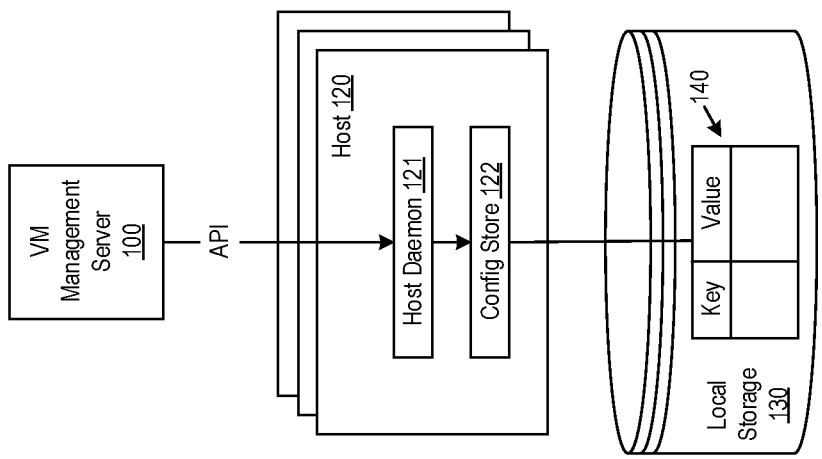
FIG. 1 is a block diagram of a virtualized computing system of the prior art in which configurations are persisted in files that are stored in local storage units.

FIG. 1 is a simplified block diagram of a virtualized computing system of the prior art in which configurations are persisted in files that are stored in local storage units 30. The virtualized computing system of FIG. 1 includes a virtual machine (VM) management server 10 that manages the lifecycle of VMs running in a cluster of hosts 20. To configure system services running in hosts 20, an end user operates a user interface (UI) (not shown) on VM management server 10 to make configuration API calls to hosts 20. A host daemon 21 running in each host 20 receives and processes these API calls. If an API call requires the virtualized computing system to set a configuration for a particular system service, host daemon 21 instructs a configuration persistence layer 22 in host 20 to persist the configuration in a local storage unit 30. The configuration is stored as a file in local storage unit 30 corresponding to the system service (i.e., file F1, file F2, . . . , file Fn). For example, if the configuration for the system service is persisted in file F1, then the next time a host 20 executes the system service, host 20 executes the system service with the configuration stored in file F1.

Figure 2:
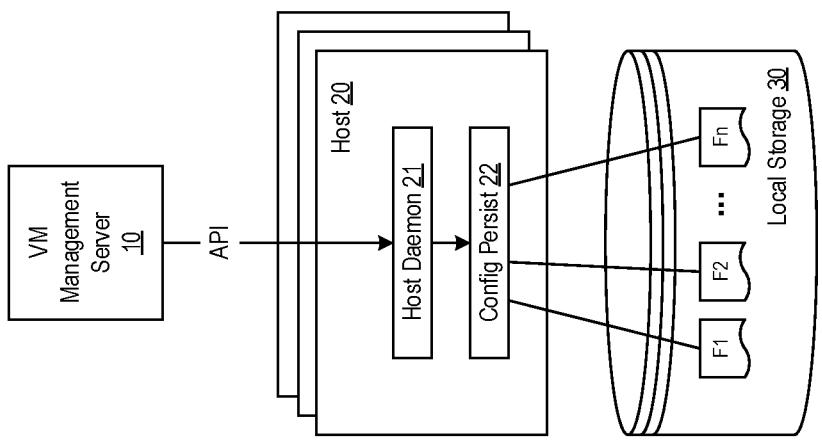
FIG. 2 is a block diagram of a virtualized computing system in which configurations are persisted in key-value stores provisioned in local storage units.

FIG. 2 is a simplified block diagram of a virtualized computing system in which configurations are persisted in key-value stores 140 provisioned in local storage units 130. The virtualized computing system of FIG. 2 includes a VM management server 100 that manages the lifecycle of VMs running in a cluster of hosts 120. To configure system services running in hosts 120, an end user operates a UI (not shown) on VM management server 100 to make configuration API calls to hosts 120. A host daemon 121 running in each host 120 receives these API calls and passes them to a configuration store 122 for processing. Configuration store 122 exposes configurations for different system services as configuration objects, each configuration object being backed by a corresponding configuration schema. Configuration store 122 records all updates to the configurations of system services in key-value store 140. In key-value store 140, a "key" corresponds to a system service, and a corresponding "value" for the key stores one or more configuration properties and one or more internal states for that system service.

Figure 3:
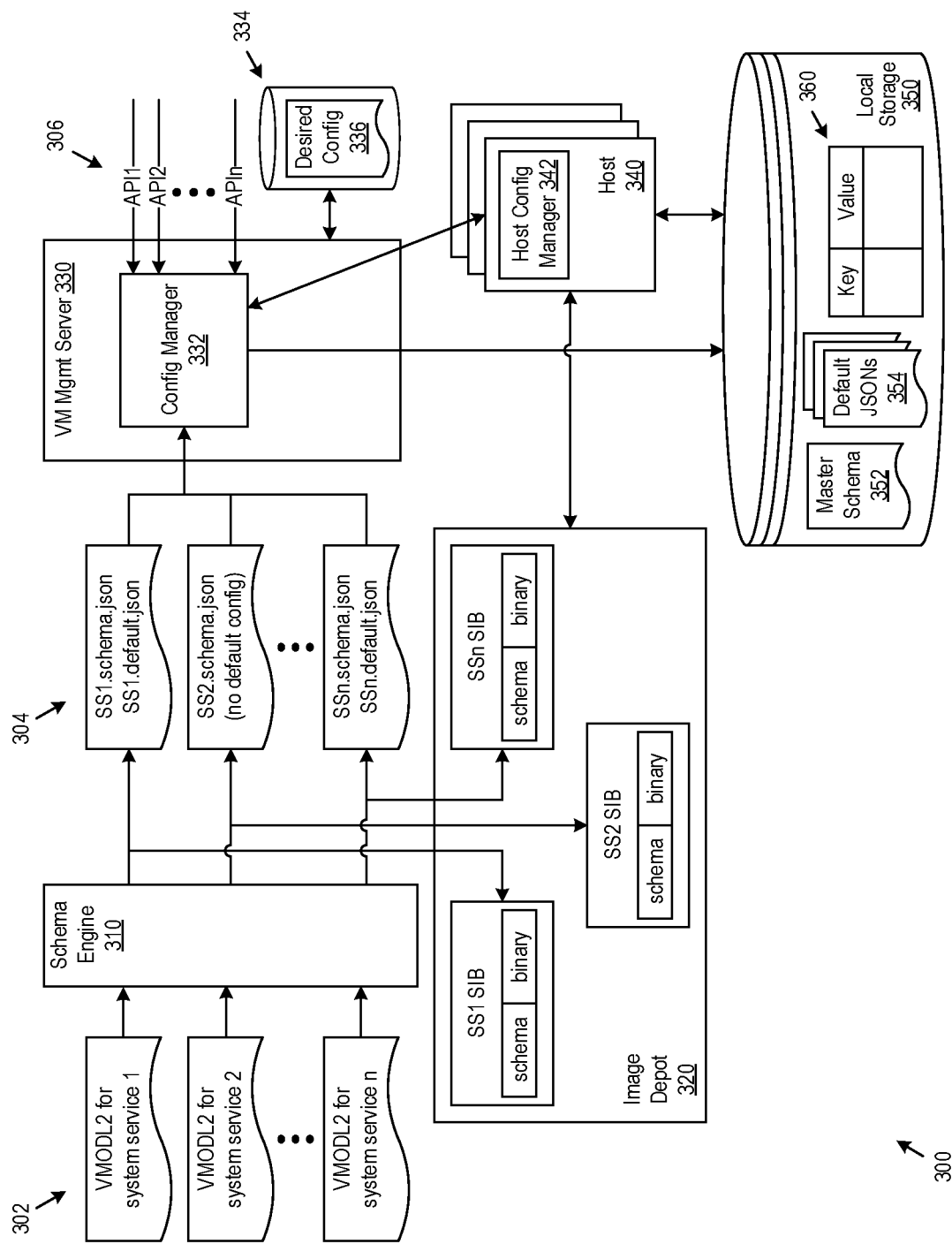
FIG. 3 is a block diagram of a computing system in which configurations are persisted in key-value stores provisioned in local storage units, according to embodiments.

FIG. 3 is a simplified block diagram of a computing system 300 in which configurations are persisted in key-value stores 360 provisioned in local storage units 350, according to embodiments. Computing system 300 includes a schema engine 310, an image depot 320, a VM management server 330, and a cluster of hosts 340.

In computing system 300, configurations for system services are defined in schemas. Software publishers of system services define the schemas in schema definition files, e.g., VMware Managed Object Design Language 2 (VMODL2) files 302. Each VMODL2 file 302 corresponds to a system service (i.e., system services 1 through n).

Schema engine 310 is a physical or virtual server that processes VMODL2 files 302 and generates schemas from the VMODL2 files. In the embodiments illustrated herein, the schemas are in the format of JavaScript Object Notation (JSON) files 304. For each VMODL2 file 302, schema engine 310 generates an individual JSON file, e.g., SS1.schema.json, referred to herein as a "configuration schema." Additionally, for each VMODL2 file 302 that contains a definition for a default configuration, schema engine 310 generates a default JSON file, e.g., SS1.default.json, referred to herein as a "default schema." A default schema for a system service contains the initial configurations for the system service, and a host 340 may revert to these initial configurations as described in U.S. patent application Ser. No. 16/837,760, filed Apr. 1, 2020, the entire contents of which are incorporated by reference herein. In the example given in FIG. 3, default schemas are available for system services 1 and n, but not for system service 2.

Image depot 320 is a storage service that stores software installation bundles (SIBs) for system services executed on hosts 340, i.e., "SS1 SIB," "SS2 SIB," and "SSn SIB." Each SIB contains the binaries for executing a system service on a host 340. Additionally, each SIB embeds JSON files generated by schema engine 310 in its metadata. For example, SS1 SIB contains the binaries for executing system service 1 and also embeds SS1.schema.json and SS1.default.json in its metadata.

Hosts 340 are servers that may be constructed on server grade hardware platforms such as x86 architecture platforms. Each host 340 contains a virtualization software layer (not shown) supporting a VM execution space for concurrently instantiating and executing VMs. Hosts 340 run system services based on configurations stored in key-value stores 360, which are persisted in local storage units 350.

Local storage units 350 are provisioned in shared storage that may comprise, e.g., magnetic disks or flash memory in a storage area network (SAN), and a separate local storage unit 350 is provisioned for each host 340. Each host 340 maintains its own key-value store 360 in local storage unit 350. In addition, each host 340 maintains a separate copy of master schema JSON file 352 and default JSON files 354.

Master schema JSON file 352 is the master configuration schema of all system services running in hosts 340. Each default JSON file 354 is the default configuration schema for one of the system services and contains the default configuration for that system service.

Each key-value store 360 is a database in which a "key" corresponds to a system service, and a corresponding "value" for the key stores one or more configuration properties and one or more internal states for that system service. The current configuration state of the system services running in each host 340 is maintained in key-value store 360 corresponding to that host 340. "Drift" occurs when the actual configuration state, as persisted in key-value store 360, deviates from the desired configuration state, as defined in a desired configuration JSON file 336 of a local storage unit 334 accessible by VM management server 330. The user defines the desired configuration state in desired configuration JSON file 336 using APIs 306 as described below.

VM management server 330 is a physical or virtual server that manages the lifecycle of VMs running in hosts 340. VM management server 330 also manages installation and configuration of system services in hosts 340. During installation of system services, hosts 340 retrieve binaries of the system services from image depot 320 and load them into memory for execution therein, and configuration manager 332 extracts the configuration schemas and any default schemas embedded in the metadata of these system services. Configuration manager 332 generates master schema JSON file 352 from the configuration schemas of these system services and stores master schema JSON file 352 in local storage units 350. In addition, configuration manager 332 stores any default schemas in local storage units 350.

Each host 340 contains a host configuration manager 342 for accessing key-value store 360 in response to an "apply" API call received from configuration manager 332. To make the apply API call, configuration manager 332 accesses desired configuration JSON file 336 from local storage unit 334 and transmits desired configuration JSON file 336 to host configuration manager 342 along with the apply API call. In response to the apply API call, host configuration manager 342 checks for drift by comparing the desired configuration state expressed in desired configuration JSON file 336 with the actual configuration state, as persisted in key-value store 360. If there is drift in any of the configuration objects, plug-ins (not shown) in host 340 update key-value store 360 to apply all the configurations that are in drift.

Figure 7A:
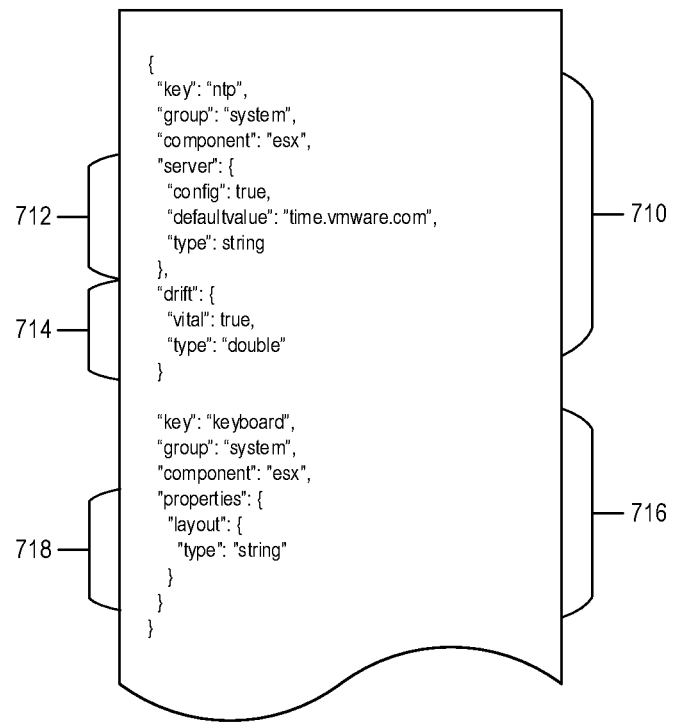
FIG. 7A is an example of a desired configuration JSON file and key-value store.

To configure system services running in hosts 340, an end user operates a UI (not shown) on VM management server 330 to make configuration API calls 306, which are exposed by configuration manager 332. Configuration API calls 306 include "set," "update," "delete," and "get" API calls. In response, configuration manager 332 updates desired configuration JSON file 336 and makes an apply API call to host configuration managers 342 running in hosts 340 to apply the configurations defined in the updated desired configuration JSON file 336, as illustrated in FIGS. 7B-7D.

Figure 7B:
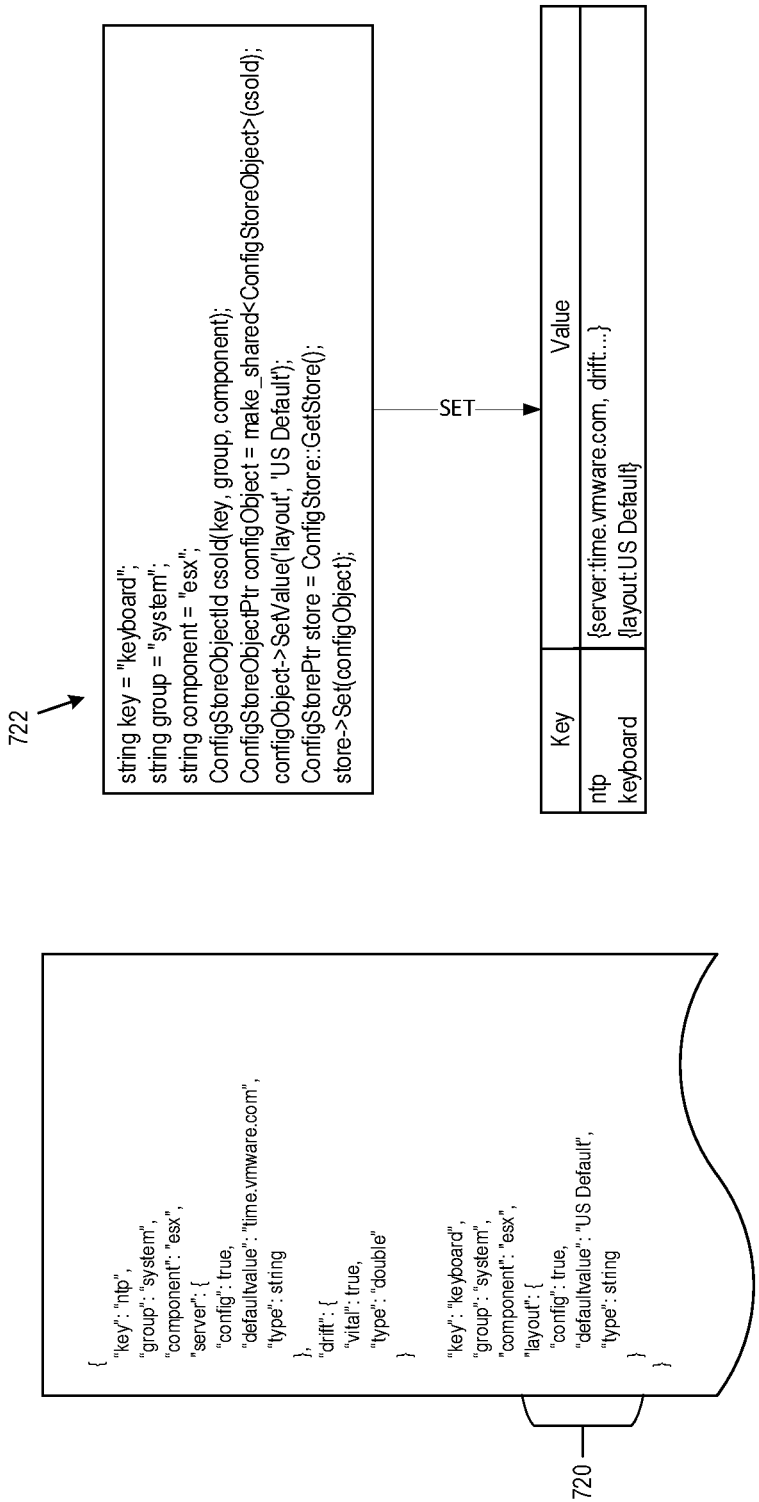
FIG. 7B is an example of a desired configuration JSON file and key-value store after set API commands are executed.
Figure 7C:
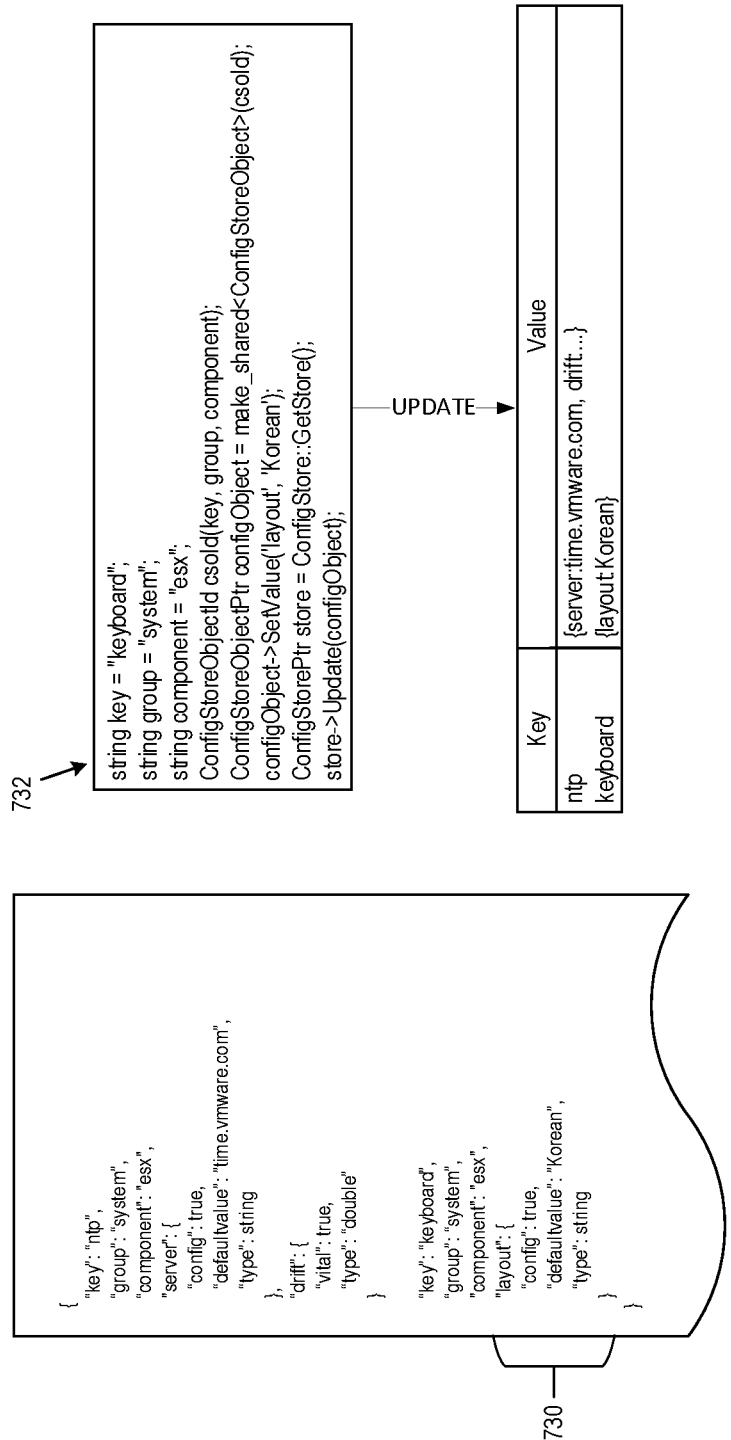
FIG. 7C is an example of a desired configuration JSON file and key-value store after update API commands are executed.
Figure 7D:
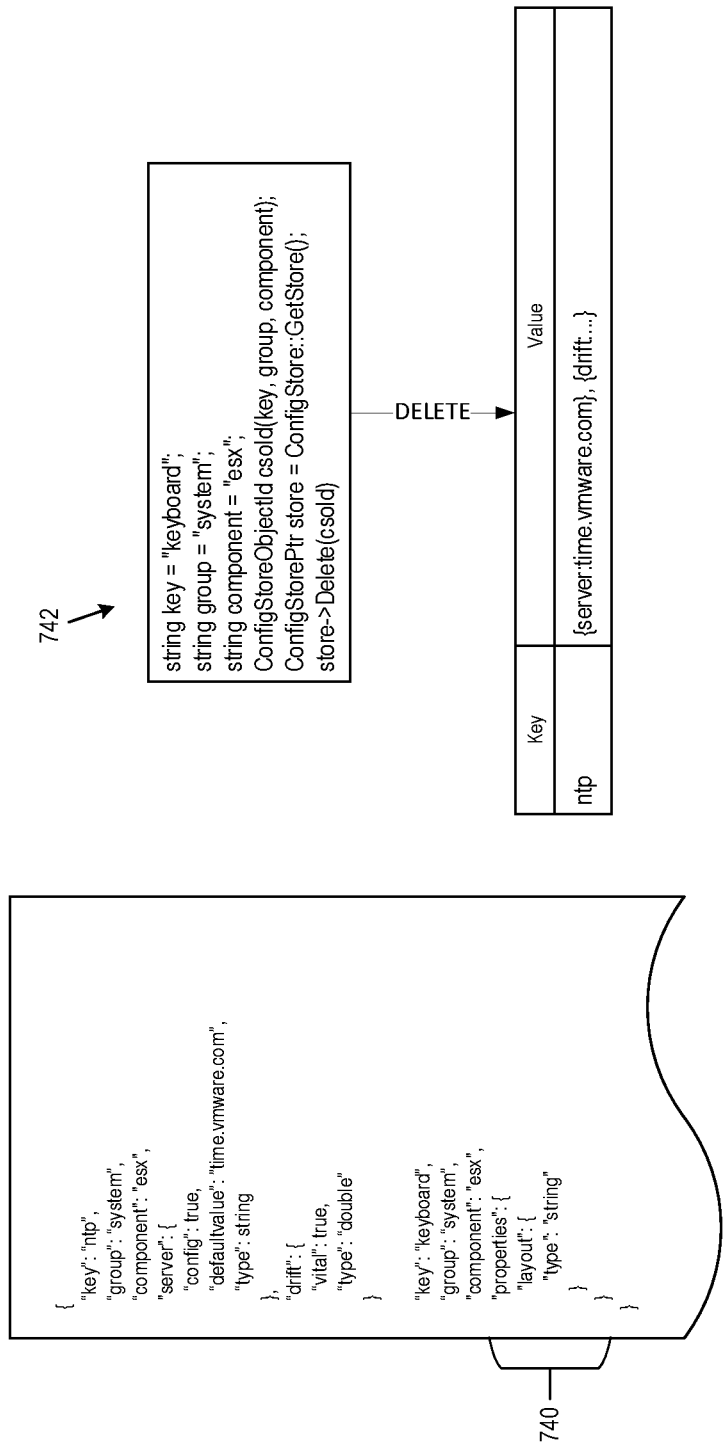
FIG. 7D is an example of a desired configuration JSON file and key-value store after delete API commands are executed.
Figure 7E:
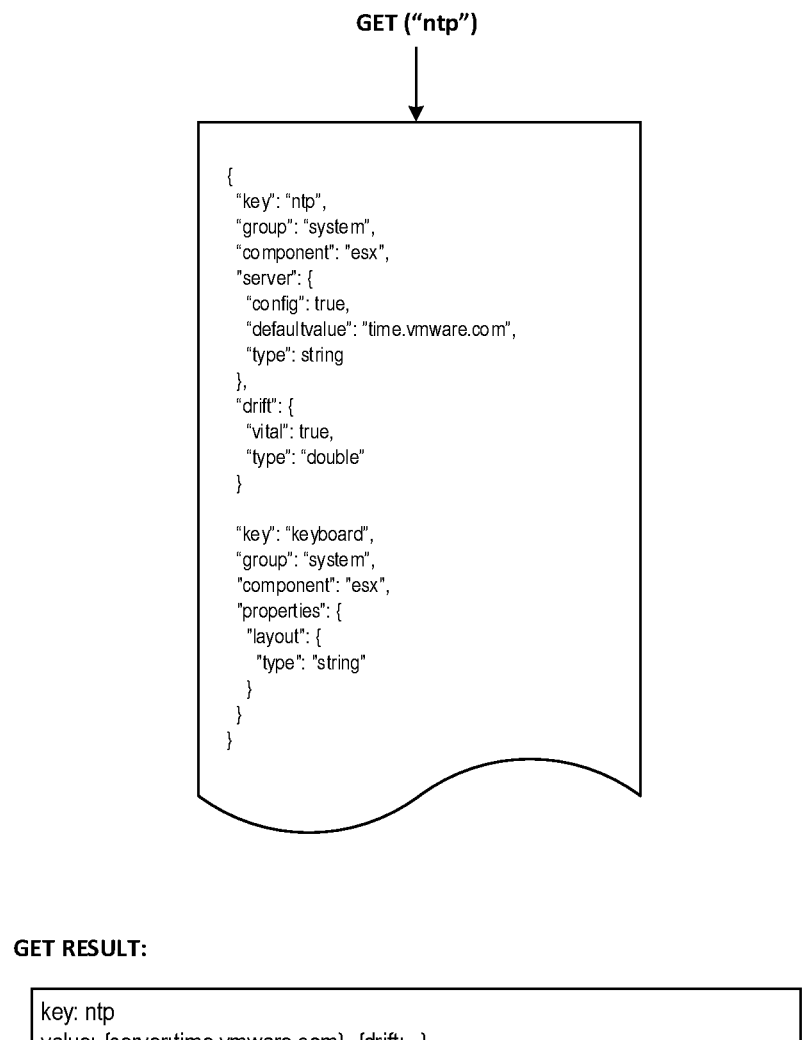
FIG. 7E is an example of a result of a get API command.

A set API call 306 creates or overwrites a configuration object in desired configuration JSON file 336 corresponding to the system service identified in the API call, as illustrated in FIG. 7B. An update API call 306 updates a configuration object in desired configuration JSON file 336 for the system service identified in the API call, as illustrated in FIG. 7C. A delete API call 306 deletes part of a configuration object in desired configuration JSON file 336 for the system service identified in the API call, as illustrated in FIG. 7D. Changes made to desired configuration JSON file 336 pursuant to set, update, and delete API calls result in changes to configuration objects in key-value store 360 via apply API calls. A get API call 306 retrieves a configuration object from a desired configuration JSON file 336 for the system service identified in the API call, as illustrated in FIG. 7E.

Figure 4:
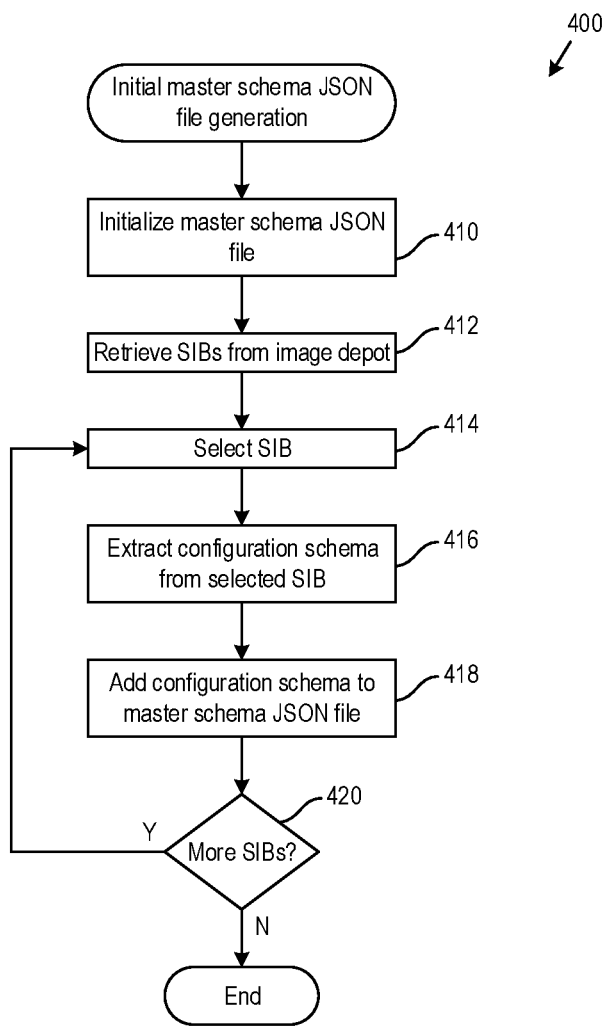
FIG. 4 is a flow diagram of a method carried out by a virtual machine management server to generate a master configuration schema, according to an embodiment.

FIG. 4 is a flow diagram of a method 400 carried out by VM management server 330 to generate an initial master schema JSON file 352, according to an embodiment.

At step 410, configuration manager 332 initializes a master schema JSON file 352 without any configuration schemas. At step 412, configuration manager 332 retrieves all the SIBs from image depot 320, each SIB containing a configuration schema for a system service embedded in its metadata.

At step 414, configuration manager 332 selects a SIB, e.g., SS1 SIB. At step 416, configuration manager 332 extracts the configuration schema embedded in the selected SIB, e.g., SS1.schema.json. At step 418, configuration manager 332 adds the extracted configuration schema to the master schema JSON file 352 initialized at step 410.

At step 420, configuration manager 332 determines if there is a SIB for another system service to extract a configuration schema from. If there is, then method 400 moves back to step 414. Otherwise, method 400 ends.

Figure 5:
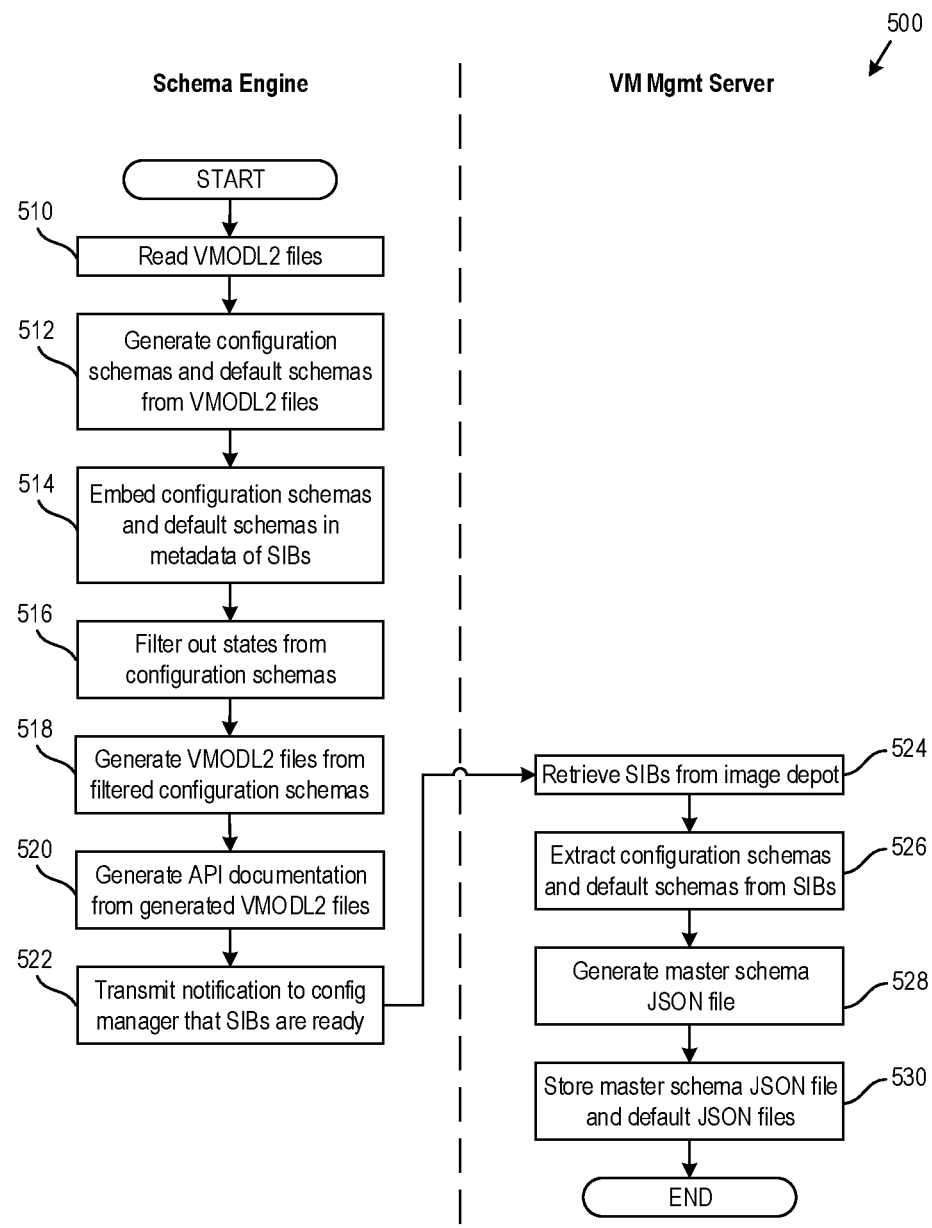
FIG. 5 is a flow diagram of a method carried out by a schema engine and virtual machine management server to embed configuration schemas in metadata of software installation bundles, automatically generate API documentation for APIs that are called to configure system services of a computing system, and generate a master configuration schema, according to an embodiment.

FIG. 5 is a flow diagram of a method 500 carried out by schema engine 310 and VM management server 330 to embed configuration schemas in metadata of SIBs, automatically generate API documentation for APIs that are called to configure system services of computing system 300, and generate master schema JSON file 352, according to an embodiment.

At step 510, schema engine 310 reads VMODL2 files 302 that have been generated by software vendors of the system services. At step 512, schema engine 310 generates configuration schemas and default schemas from VMDOL2 files 302. For example, for the VMODL2 file 302 for system service 1, schema engine 310 generates SS1.schema.json and SS1.default.json.

At step 514, schema engine 310 embeds the configuration schemas and default schemas in the metadata of the SIBs of image depot 320. For example, schema engine 310 embeds copies of SS1.schema.json and SS1.default.json in the metadata of SS1 SIB.

At step 516, schema engine 310 filters out internal states defined in separate copies of the configuration schemas, thus leaving only configuration properties for the associated system services. At step 518, schema engine 310 generates a VMODL2 file from each filtered configuration schema. At step 520, schema engine 310 generates API documentation from the generated VMODL2 files. Specifically, schema engine 310 generates API documentation for set, update, delete, and get API calls for each system service.

At step 522, schema engine 310 transmits a notification to configuration manager 332 that the SIBs of image depot 320 are ready for retrieval of the schemas.

At step 524, configuration manager 332 retrieves the SIBs from image depot 320. At step 526, configuration manager 332 extracts the configuration schemas and default schemas from the retrieved SIBs. At step 528, configuration manager 332 generates master schema JSON file 352 from the configuration schemas extracted at step 526 according to the method of FIG. 4.

At step 530, configuration manager 332 stores master schema JSON file 352 and the default JSON files in local storage units 350. After step 530, method 500 ends.

Figure 6:
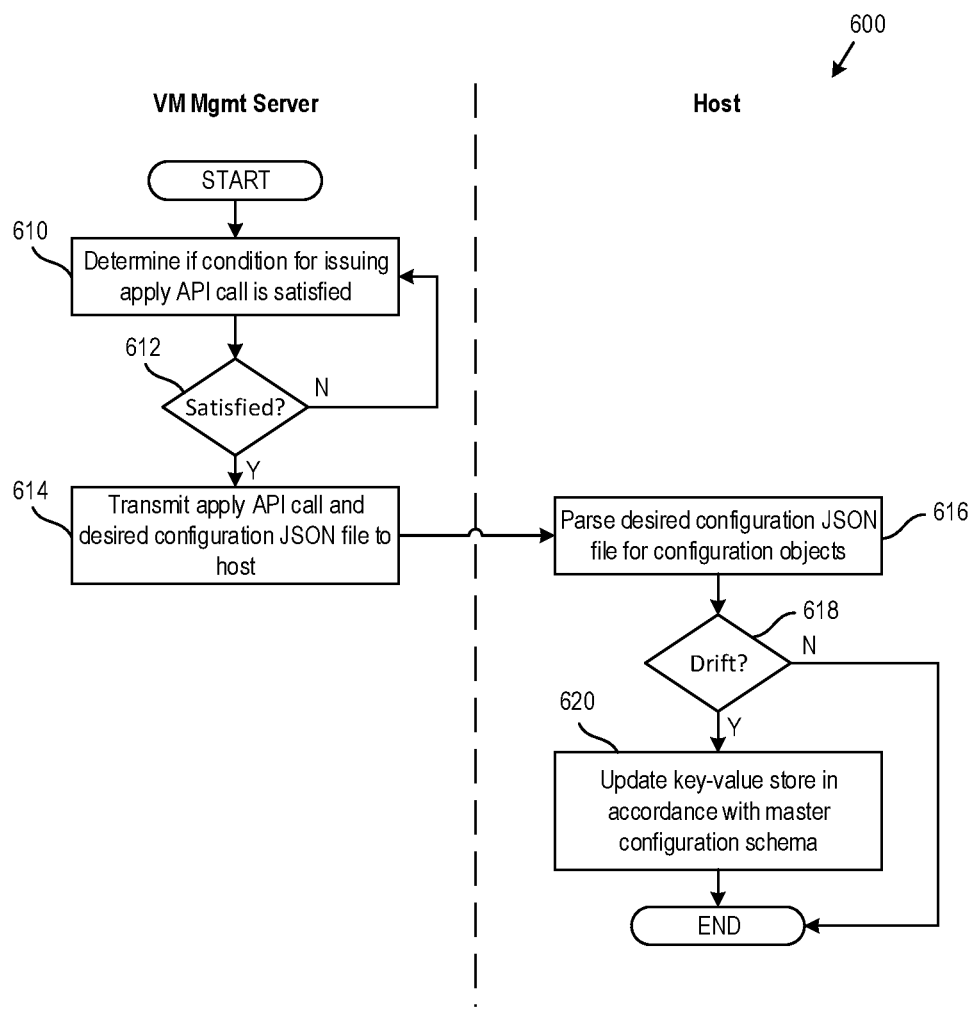
FIG. 6 is a flow diagram of a method carried out by a virtual machine management server and host to persist configurations of a desired configuration JSON file in a key-value store, according to an embodiment.

FIG. 6 is a flow diagram of a method 600 carried out by VM management server 330 and a host 340 to persist configurations of desired configuration JSON file 336 in a key-value store 360, according to an embodiment.

At step 610, configuration manager 332 determines if a condition for issuing an apply API call is satisfied for host 340. The condition for issuing an apply API call may be drift or an update to desired configuration JSON file 336 (e.g., when a user makes one of configuration API calls 306). Configuration manager 332 may periodically transmit a request to a host 340 to check for drift or may transmit a request in response to a user command.

At step 612, if the condition is not satisfied, configuration manager 332 returns to step 610 to check again if the condition for issuing an apply API call is satisfied. If the condition is satisfied, configuration manager 332 at step 614 transmits an apply API call to host 340 along with desired configuration JSON file 336.

At step 616, host configuration manager 342 parses desired configuration JSON file 336 for configuration objects. At step 618, host configuration manager 342 determines if any of the configuration objects are in drift, i.e., the actual state does not match the desired state. If not, method 600 ends. If so, host configuration manager 342 at step 620 executes plug-ins associated with the configuration objects in drift to apply the desired state and update the configuration objects in key-value store 360 in accordance with master schema JSON file 352.

If any updates to the configuration objects in key-value store 360 are not in accordance with master schema JSON file 352, host configuration manager 342 returns an error message to configuration manager 332, and method 600 ends.

The updates may include a creation of a key-value entry, an update to an existing key-value entry, or a deletion of an existing key-value entry. To create a key-value entry, a plug-in issues a "set" API command to key-value store 360. To update an existing key-value entry, the plug-in issues an "update" API command to key-value store 360. To delete an existing key-value entry, the plug-in issues a "delete" API command to key-value store 360.

After step 620, method 600 ends, and host 340 runs system services with the updated configurations specified in key-value store 360.

FIG. 7A is an example of desired configuration JSON file 336 and key-value store 360. In the example of FIG. 7A, desired configuration JSON file 336 contains two configuration objects: one for an NTP system service, identified by the key "ntp," and another for a keyboard system service, identified by the key "keyboard." It should be understood that the example of desired configuration JSON file 336 shown in FIG. 7A is simplified for purposes of illustration and actual examples of desired configuration JSON file 336 contain many more configuration objects.

Lines 710 create the NTP configuration object. As shown in lines 712, the NTP configuration object contains a "server" configuration property, and the value for the server configuration property is "time.vmware.com." Additionally, as shown in lines 714, the NTP configuration object contains a "drift" vital internal state that may be set with a value of type "double."

Lines 716 create the keyboard configuration object. As shown in lines 718, no values have been set for the keyboard configuration object. However, the keyboard configuration object contains a "layout" configuration property that may be set with a value of type "string." Additionally, the keyboard configuration object may contain one or more internal states (not shown).

Key-value store 360 contains an entry for an NTP configuration object. The NTP configuration object contains the value "time.vmware.com" for the server configuration property and a value for the drift internal state. There is no entry for a keyboard configuration object because no values have been set for the keyboard configuration object in desired configuration JSON file 336.

FIG. 7B is an example of desired configuration JSON file 336 and key-value store 360 after a set API command is executed by configuration manager 332 on the desired configuration JSON file 336 of FIG. 7A. As shown in lines 720, after the set API command is executed on desired configuration JSON file 336, the layout configuration property contains the value "US Default."

After the layout configuration property is set in desired configuration JSON file 336, configuration manager 332 issues an apply API call with desired configuration JSON file 336 to host 340 to match the actual configuration state with the desired configuration state. In response, host configuration manager 342 detects that the system service "keyboard" is in drift, and issues a second set API call, represented as lines 722, to update key-value store 360 to contain an entry for a keyboard configuration object. As in desired configuration JSON file 336, the keyboard configuration object contains the value "US Default" for the layout configuration property.

FIG. 7C is an example of desired configuration JSON file 336 and key-value store 360 after an update API command is executed by configuration manager 332 on the desired configuration JSON file 336 of FIG. 7B. As shown in lines 730, after the update API command is executed on desired configuration JSON file 336, the layout configuration property contains the value "Korean."

After the layout configuration property is updated in desired configuration JSON file 336, configuration manager 332 issues an apply API call with desired configuration JSON file 336 to host 340 to match the actual configuration state with the desired configuration state. In response, host configuration manager 342 detects that the system service "keyboard" is in drift, and issues a second update API call, represented as lines 732, to update key-value store 360. The layout configuration property in key-value store 360 is then updated from "US Default" to "Korean."

FIG. 7D is an example of desired configuration JSON file 336 and key-value store 360 after a delete API command is executed by configuration manager 332 on the desired configuration JSON file 336 of FIG. 7C. As shown in lines 740, after the delete API command is executed on desired configuration JSON file 336, the layout configuration property no longer contains a value.

After the layout configuration property is deleted from desired configuration JSON file 336, configuration manager 332 issues an apply API call with desired configuration JSON file 336 to host 340 to match the actual configuration state with the desired configuration state. In response, host configuration manager 342 detects that the system service "keyboard" is in drift, and issues a second delete API call, represented as lines 742, to key-value store 360. The layout configuration property in key-value store 360 is then deleted along with the keyboard configuration object.

FIG. 7E is an example of a result of a get API command executed on desired configuration JSON file 336 of FIG. 7D. The get API command executed in the example of FIG. 7E retrieves configuration properties and internal states for the NTP system service. The result that is returned in response to the get API command includes the server configuration property with the value time.vmware.com and the drift internal state with the value currently stored for the drift state.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are hard disk drives (HDDs), solid-state drives (SSDs), network-attached storage (NAS) systems, read-only memory (ROM), random-access memory (RAM), compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest operating system (OS) that perform virtualization functions.

Boundaries between components, operations, and local storage units are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of managing configurations of a plurality of system services, including a first system service and a second system service, in each of a plurality of hosts, wherein each of the hosts is configured with a virtualization software for supporting execution of virtual machines therein, said method comprising:
   generating a master configuration schema from a plurality of individual configuration schemas, each of the individual configuration schemas corresponding to one of the plurality of system services, and the master configuration schema including all the individual configuration schemas and defining one or more configuration properties of the first system service, one or more internal states of the first system service, one or more configuration properties of the second system service, and one or more internal states of the second system service; and
   upon receiving an application programming interface (API) call to apply to the plurality of system services desired configurations of the plurality of system services, the desired configurations of the plurality of system services being defined in a desired configuration file, parsing the desired configuration file to identify a first desired configuration for the first system service and a second desired configuration for the second system service, and storing the first and second desired configurations in accordance with the master configuration schema,
   wherein the first system service executes with the stored first desired configuration applied thereto, and the second system service executes with the stored second desired configuration applied thereto.

2. The method of claim 1, further comprising:
   generating schema definition files from filtered configuration schemas, wherein the filtered configuration schemas are prepared by filtering out definitions of internal states of the plurality of system services from unfiltered configuration schemas; and
   for each of the plurality of system services, generating API documentation for a plurality of APIs from the schema definition files,
   wherein the APIs for each of the plurality of system services include a set API call for defining a configuration of the system service in the desired configuration file, an update API call for updating a configuration of the system service in the desired configuration file, a delete API call for deleting a configuration of the system service, and a get API call for retrieving a configuration of the system service.

3. The method of claim 1, wherein each of the plurality of system services has a corresponding software installation bundle that is stored in an image depot and that contains both executable code of the system service and the individual configuration schema of the system service.

4. The method of claim 1, further comprising:
   for each of the plurality of system services, generating the individual configuration schema from a schema definition file prepared for the system service.

5. The method of claim 4, further comprising:
   for each of the plurality of system services, generating from the schema definition file prepared for the system service, a default configuration schema that defines a default configuration for the system service.

6. The method of claim 5, wherein the first desired configuration overrides any default configuration defined for the first system service, and the second desired configuration overrides any default configuration defined for the second system service.

7. The method of claim 1, wherein the first and second desired configurations are stored in a key-value database, keys of the key-value database each corresponding to one of the plurality of system services.

8. A computing system comprising:
   a plurality of hosts each configured with a virtualization software for supporting execution of virtual machines therein, wherein each of the hosts includes a plurality of system services including a first system service and a second system service; and
   a management server for the cluster of hosts, wherein the computing system is configured to carry out a method of managing configurations of the plurality of system services in each of the hosts, said method comprising:
      generating by the management server, a master configuration schema from a plurality of individual configuration schemas, each of the individual configuration schemas corresponding to one of the plurality of system services, and the master configuration schema including all the individual configuration schemas and defining one or more configuration properties of the first system service, one or more internal states of the first system service, one or more configuration properties of the second system service, and one or more internal states of the second system service; and
      upon receiving an application programming interface (API) call to apply to the plurality of system services desired configurations of the plurality of system services, the desired configurations of the plurality of system services being defined in a desired configuration file, parsing by a host of the cluster of hosts, the desired configuration file to identify a first desired configuration for the first system service and a second desired configuration for the second system service, and storing by the host, the first and second desired configurations in accordance with the master configuration,
      wherein the first system service executes with the stored first desired configuration applied thereto, and the second system service executes with the stored second desired configuration applied thereto.

9. The computing system of claim 8,
wherein the management server is configured to:
generate schema definition files from filtered configuration schemas, wherein the filtered configuration schemas are prepared by filtering out definitions of internal states of the plurality of system services from unfiltered configuration schemas; and
for each of the plurality of system services, generate API documentation for a plurality of APIs from the schema definition files,
wherein the APIs for each of the plurality of system services include a set API call for defining a configuration of the system service in the desired configuration file, an update API call for updating a configuration of the system service in the desired configuration file, a delete API call for deleting a configuration of the system service, and a get API call for retrieving a configuration of the system service.

10. The computing system of claim 8, wherein each of the plurality of system services has a corresponding software installation bundle that is stored in an image depot and that contains both executable code of the system service and the individual configuration schema of the system service.

11. The computing system of claim 8, further comprising:
a schema engine configured to generate, for each of the plurality of system services, the individual configuration schema from a schema definition file prepared for the system service.

12. The computing system of claim 11, wherein the schema engine is further configured to generate, for each of the plurality of system services from the schema definition file prepared for the system service.

13. The computing system of claim 12, wherein the first desired configuration overrides any default configuration defined for the first system service, and the second desired configuration overrides any default configuration defined for the second system service.

14. The computing system of claim 8, wherein the first and second desired configurations are stored in a key-value database, keys of the key-value database each corresponding to one of the plurality of system services.

15. A non-transitory computer readable medium comprising instructions to be executed in a computing system to carry out a method of managing configurations of a plurality of system services, including a first system service and a second system service, in each of a plurality of hosts, wherein each of the hosts is configured with a virtualization software for supporting execution of virtual machines therein, and wherein the method comprises:
generating a master configuration schema from a plurality of individual configuration schemas, each of the individual configuration schemas corresponding to one of the plurality of system services, and the master configuration schema including all the individual configuration schemas and defining one or more configuration properties of the first system service, one or more internal states of the first system service, one or more configuration properties of the second system service, and one or more internal states of the second system service; and
upon receiving an application programming interface (API) call to apply to the plurality of system services desired configurations of the plurality of system services, the desired configurations of the plurality of system services being defined in a desired configuration file, parsing the desired configuration file to identify a first desired configuration for the first system service and a second desired configuration for the second system service, and storing the first and second desired configurations in accordance with the master configuration schema,
wherein the first system service executes with the stored first desired configuration applied thereto, and the second system service executes with the stored second desired configuration applied thereto.

* * * * *